(12) United States Patent
Kountouris et al.

(10) Patent No.: US 10,491,364 B2
(45) Date of Patent: Nov. 26, 2019

(54) METHOD AND DEVICE FOR GENERATING A SIGNAL IN A NETWORK OF CONNECTED OBJECTS

(71) Applicant: Orange, Paris (FR)

(72) Inventors: Apostolos Kountouris, Grenoble (FR); Philippe Surbayrole, Meylan (FR); Quentin Lampin, Fontaine (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/741,102

(22) PCT Filed: Jun. 29, 2016

(86) PCT No.: PCT/FR2016/051613
§ 371 (c)(1),
(2) Date: Dec. 29, 2017

(87) PCT Pub. No.: WO2017/001775
PCT Pub. Date: Jan. 5, 2017

(65) Prior Publication Data
US 2018/0351728 A1    Dec. 6, 2018

(30) Foreign Application Priority Data

Jun. 30, 2015   (FR) ...................... 15 56166

(51) Int. Cl.
*H04L 7/00* (2006.01)
*H04W 4/70* (2018.01)
*H04L 5/00* (2006.01)

(52) U.S. Cl.
CPC .......... *H04L 7/0008* (2013.01); *H04L 5/0007* (2013.01); *H04W 4/70* (2018.02)

(58) Field of Classification Search
CPC ........................ H04L 7/0008; H04L 7/0007
(Continued)

(56) References Cited

U.S. PATENT DOCUMENTS 7,295,578 B1 * 11/2007 Lyle ...................... G06F 3/14
                                                         348/473
2001/0001616 A1 * 5/2001 Rakib ................ H03M 13/256
                                                         375/259
(Continued)

FOREIGN PATENT DOCUMENTS

EP     2068523 A1    6/2009
EP     2728909 A1    5/2014

OTHER PUBLICATIONS

English translation of the Written Opinion of the International Searching Authority dated Sep. 5, 2016 for corresponding International Application No. PCT/FR2016/051613, filed Jun. 29, 2016.
(Continued)

*Primary Examiner* — Stephen J Clawson
(74) *Attorney, Agent, or Firm* — David D. Brush; Westman, Champlin & Koehler, P.A.

(57) ABSTRACT

A signal generation method for generating a signal that is to be transmitted in a network of connected objects. The method includes: an obtaining step for obtaining a first signal conveying a stream of data acquired by a connected object of the network; a reception step for receiving a synchronization second signal including information providing a timestamp for the first signal; and a generation step for generating a third signal by using a reversible operation to combine the first signal and the synchronization second signal.

13 Claims, 2 Drawing Sheets

(58) Field of Classification Search
USPC .......................................................... 370/503
See application file for complete search history.

(56) References Cited

U.S. PATENT DOCUMENTS

| | | | |
|---|---|---|---|
| 2002/0080103 A1* | 6/2002 | Choi | G01S 3/04 345/87 |
| 2009/0080689 A1* | 3/2009 | Zhao | G06T 1/0035 382/100 |
| 2009/0173839 A1* | 7/2009 | Groeneweg | B61L 23/042 246/15 |
| 2009/0232075 A1* | 9/2009 | Konta | H04L 5/0096 370/329 |
| 2014/0287792 A1 | 9/2014 | Rainsto et al. | |
| 2014/0288828 A1* | 9/2014 | Werner | G01C 21/20 701/527 |

OTHER PUBLICATIONS

International Search Report dated Sep. 5, 2016 for corresponding International Application No. PCT/FR2016/051613, filed Jun. 29, 2016.
Written Opinion of the International Searching Authority dated Sep. 5, 2016 for corresponding International Application No. PCT/FR2016/051613, filed Jun. 29, 2016.

* cited by examiner

METHOD AND DEVICE FOR GENERATING A SIGNAL IN A NETWORK OF CONNECTED OBJECTS

CROSS-REFERENCE TO RELATED APPLICATIONS

This Application is a Section 371 National Stage Application of International Application No. PCT/FR2016/051613, filed Jun. 29, 2016, which is incorporated by reference in its entirety and published as WO 2017/001775 A1 on Jan. 5, 2017, not in English.

BACKGROUND OF THE INVENTION

The invention relates to the general field of communications by radio.

More particularly, it relates to communications, e.g. radio communications, between objects or pieces of equipment connected to a communications network (also referred to as "connected objects") and deployed in a geographical area of greater or lesser extent.

The invention applies more particularly in the context of networks of connected objects of the Internet of things (IoT) type or the machine to machine (M2M) type in which data is collected continuously, using a dedicated underlying infrastructure of a service provider suitable for providing the data as connected in this way to one or more clients. The infrastructure is made up in particular of receiver stations referred to as digitizing stations or as receiver equipment that serve to collect data and transmit it in the form of packets of digital samples to a computer system of a client of the service provider. The digital samples are indexed in the computer system in a database using various criteria, such as the criteria of time, place, and frequency. Application EP 2 728 909 describes one such infrastructure.

It can thus be understood that localization both in time and in space is key for networks of connected objects that use indexing based on criteria of that type. Such localization relies in particular on timestamping digital samples. In the meaning of the invention, "timestamping data" covers associating such data with an accurate timestamp, e.g. in the form of a date (year, month, day) and a time (hours: minutes: seconds).

In the present state of the art, data is timestamped in the digitizing receiver stations while forming packets of digital samples. For this purpose, each receiver station needs to be fitted with a synchronizer device suitable for recovering a time reference locally (e.g. a common clock broadcast by a global positioning system (GPS) signal, or a radio control clock), to synchronize the time reference relative to the digital sampling clock of the digitizing receiver station, to extract timestamping information established on the basis of the synchronized common time reference and to associate that information with the samples, and to integrate that information in the headers of packets of samples for transmitting to the computer system.

Depending on the desired accuracy of timestamping, those operations impose major hardware and/or software constraints on the receiver stations and can lead to non-negligible implementation costs.

In addition, that complexity and those costs need to be met by the receiver stations even if, in the end, the timestamping information is not used by the information system of the client of the service provider.

OBJECT AND SUMMARY OF THE INVENTION

In a first aspect, the invention seeks in particular to remedy these drawbacks by proposing a signal generation method for generating a signal that is to be transmitted in a network of connected objects, the method comprising:

an obtaining step for obtaining a first signal conveying a stream of data acquired by a connected object of the network;

a reception step for receiving a synchronization second signal including information providing a timestamp for the first signal; and a generation step for generating a third signal by using a reversible operation to combine the first signal and the synchronization second signal.

Correspondingly, the invention provides a signal generator device for generating a signal that is to be transmitted in a network of connected objects, the device comprising:

an obtaining module for obtaining a first signal conveying a stream of data acquired by a connected object of the network;

a receiver module for receiving a synchronization second signal including information providing a timestamp for the first signal; and a signal generator module for generating a third signal by using a reversible operation to combine the first signal and the synchronization second signal.

The term "reversible operation" is used to cover any type of processing for which there exists a so-called "inverse" operation that can be applied to the third signal and that makes it possible to extract from the third signal the information conveyed by the first signal and by the synchronization second signal. Examples of such an operation are given below. It should be observed that this inverse operation does not necessarily obtain a reconstruction of the first and second signals that is accurately identical to the first and second signals used for generating the third signal. A reconstruction that obtains the information (data or timestamp information) conveyed by the first and second signals with sufficient quality (e.g. sufficient signal-to-noise ratio) suffices to be considered as being "reversible" in the meaning of the invention. In other words, in the meaning of the invention, the notion of an operation that is reversible includes orthogonal operations that enable the first and second signals to be restored identically and also operations that are not orthogonal, but may be said to be "quasi-reversible", that do not lead to exact restoration (i.e. reconstruction) of the first and second signals, providing these operations still make it possible to extract the information conveyed by those signals.

It should also be observed that such a signal generator device of the invention may equally well be located in various entities of the network of connected objects, such as for example in a digitizing receiver station or in a connected object from which the data originates (e.g. a sensor). The signal processor device of the invention may be located in an information system of a client of the operator of the network of connected objects, which client makes use of the data collected by the network.

The invention thus makes it easy to associate data obtained by a connected object with accurate timestamp information for that data, by means of a third signal, which information can easily be extracted from the third signal on demand. In other words, the first signal conveying the data acquired by the connected object is "marked" in accordance with the invention with timestamp information. This information is contained intrinsically in the synchronization second signal and it is combined raw with the data acquired by the connected object, i.e. as it comes and without any prior processing. Where necessary, the devices receiving the third signal in accordance with the invention are thus left free to extract and make use of the timestamp information.

The invention thus serves advantageously to transfer the task of accurately timing the data acquired by the connected object from the receiver equipment and/or the digitizing receiver station to the entity that needs to timestamp the signal (e.g. the information system hosting the database in which the data is stored).

In other words, it is no longer necessary systematically and locally at the digitizing receiver station to timestamp the acquired data, as in the prior art, and this timestamping can be performed on demand and in centralized manner, e.g. in the client's information system, which is generally subjected to lesser constraints of implementation and of complexity than are the receiver stations.

Furthermore, the invention makes it possible to improve the accuracy with which the data is timestamped. By way of example, the second signal may be received from a satellite navigation system (e.g. the global positioning system (GPS), GLONASS, Galileo, etc.). In known manner, such a system delivers timestamping information that is accurate and reliable. Timestamping in the invention makes use directly of the information included in the second signal without requiring this information to be transformed and without requiring the prior art operations that consist in determining timestamping information after synchronizing the digitizing receiver station with a common reference, which operations can lead to inaccuracies in the resulting timestamp information. Thus, the solution of the invention improves the accuracy with which the first signal is timestamped, while simplifying the design of the digitizing receiver station.

By combining the two signals in reversible manner, the timestamping information for the data can be extracted easily at little cost.

In a particular embodiment of the invention, the reversible operation comprises frequency multiplexing the first and second signals on two consecutive frequency bands. Advantageously, such multiplexing may be performed merely by shifting the frequencies of the first signal and of the second signal, and is therefore easy to perform and to invert.

In a variant, this reversible operation comprises multiplexing the first and second signals using orthogonal codes. The third signal thus occupies a smaller frequency band.

Naturally, other reversible operations may be envisaged, such as for example steganographic multiplexing of the first and second signals.

In known manner, such multiplexing consists in considering the data conveyed by the first signal and in modifying it as discreetly as possible so as to hide the information conveyed by the second signal. In the context of the invention, one way of performing such multiplexing may thus consist for example in using a few low weight bits of the samples of the first signal to convey the bits of the synchronization second signal.

As mentioned above, the signal generation method may be performed in the connected object or in the digitizing receiver station of the network of connected objects.

Thus, when the method is performed in the connected object, the third signal is an analog signal. In this implementation, the method then includes a step of the connected object transmitting the third signal to a digitizing receiver station of the network of connected objects, e.g. by radio.

When the method is performed in a digitizing receiver station of the network of connected objects, the method of the invention further includes a step of digitizing the third signal, a step of subdividing the digitized third signal into packets, and a step of transmitting packets to an information system via a communications network.

In a variant, when the method is performed in a digitizing receiver station of the network of connected objects, the method of the invention further includes a step of digitizing the first signal and the synchronization second signal prior to the signal generation step, a step of subdividing the digitized third signal into packets, and a step of transmitting the packets to an information system via a communications network.

The invention thus provides great flexibility of implementation.

In a second aspect, the invention provides a signal processing method for processing a signal transmitted in a network of connected objects and generated by a signal generation method of the invention, the signal processing method including an extraction step for extracting data conveyed by the first signal and/or timestamp information contained in the synchronization second signal from the received signal by using an operation that is the inverse of the reversible operation used during the signal generation method.

In a particular implementation, this signal processing method includes an obtaining step for obtaining a timestamp for the data conveyed by the first signal and/or a location for the connected object that acquired the data, by using the information included in the synchronization second signal.

Correspondingly, the invention provides a signal processor device for processing a signal transmitted in a network of connected objects, the device comprising:
  a receiver module for receiving, via a communications network, a signal generated by a signal generator device of the invention;
  an extractor module configured to extract data conveyed by the first signal and/or the timestamp information included in the synchronization second signal from the received signal by using an operation that is the inverse of the reversible operation used during the signal generation method.

In a third aspect, the invention provides communication system comprising:
  at least one connected object and at least one digitizing receiver station of a network of connected objects; and
  an information system comprising a signal processor device of the invention;
  wherein at least one piece of equipment of the network of connected objects selected from said at least one connected object and said at least one digitizing receiver station includes a signal generator device of the invention.

The particular advantages and characteristics of the signal generator device, of the signal processor device, and of the communication system of the invention are identical to those of the above-described methods and are not recalled again.

In other embodiments or implementations, it may also be advantageous to envisage that the signal generation method, the signal processing method, the signal generator device, the signal processor device, and the communication system of the invention present in combination some or all of the above-mentioned characteristics.

In a particular implementation, the various steps of the signal generation method and/or of the signal processing method are determined by computer program instructions.

Consequently, the invention also provides a computer program on a data medium, the program being suitable for being performed in a computer in order to perform steps of the methods of the invention, as described briefly above.

The program may use any programming language, and be in the form of source code, object code, or code intermediate between source code and object code, such as in a partially complied form, or in any other desirable form.

The invention also provides a computer-readable data medium including instructions of the computer program as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk, or a hard disk, or even a universal serial bus (USB) key.

Furthermore, the data medium may be a transmissible medium such as an electrical or optical signal suitable for being conveyed via an electrical or optical cable, by radio, or by other means. Programs of the invention may in particular be downloaded from an Internet type network.

Alternatively, the data medium may be constituted by integrated circuits in which the program is incorporated, the circuits being adapted to execute or to be used in the execution of the method in question.

BRIEF DESCRIPTION OF THE DRAWINGS

Other characteristics and advantages of the present invention appear from the following description given with reference to the accompanying drawings, which show an embodiment having no limiting character. In the figures.

DETAILED DESCRIPTION OF THE INVENTION

Figure 1:
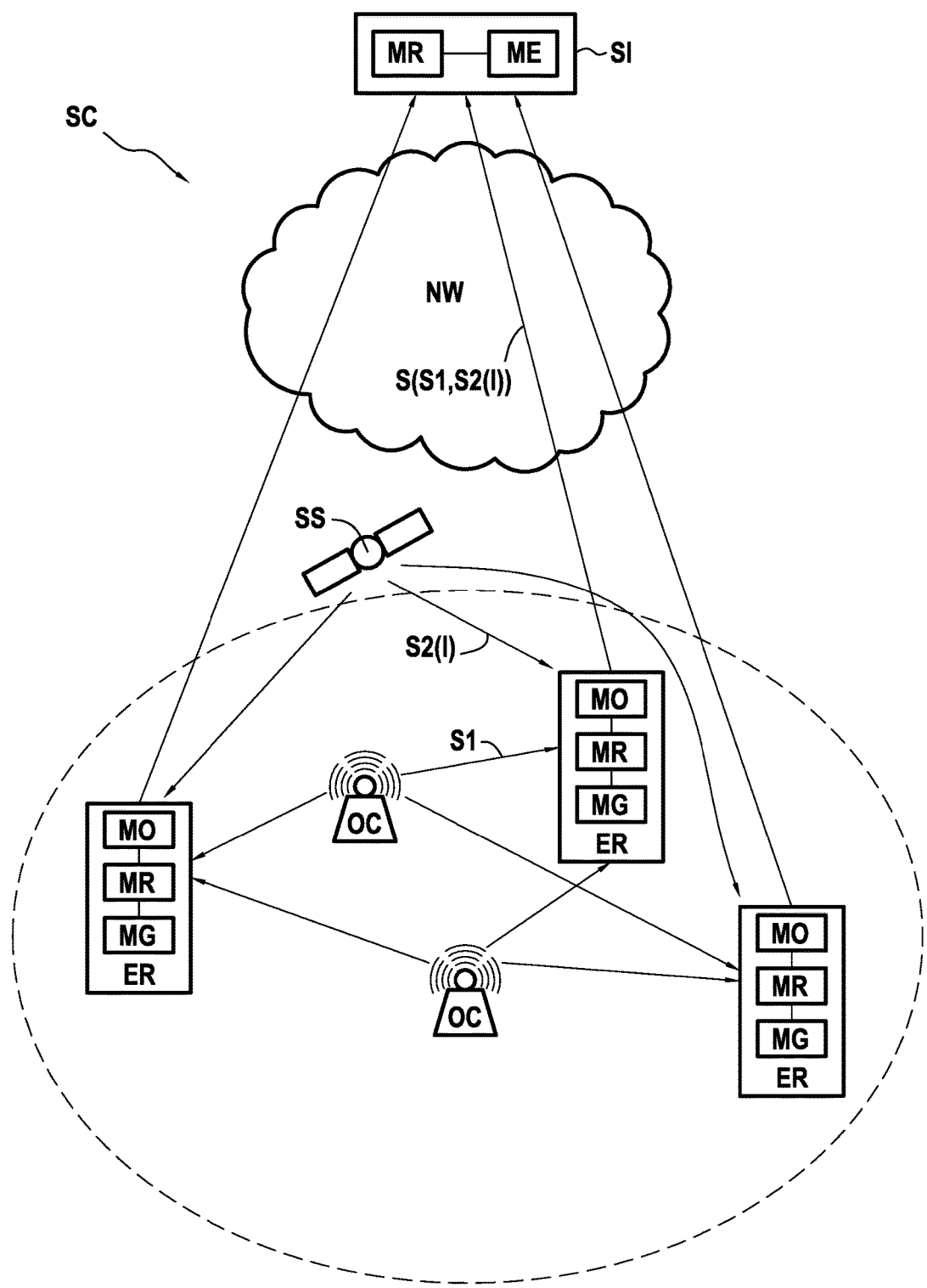
FIG. 1 shows a communication system in accordance with the invention in a particular embodiment of the invention.

FIG. 1 shows a communication system SC in accordance with the invention in its environment in a particular embodiment of the invention. In this example, the system SC comprises a plurality of receiver stations ER and a plurality of connected objects OC (e.g. water consumption sensors) forming a network of connected objects of a service provider, together with an information system SI of a client entity of that service provider.

In the presently-described embodiment, each receiver station ER has a signal generator device DG in accordance with the invention, and the information system SI is provided with a signal processor device DD in accordance with the invention. In a variant, some or all of the receiver stations ER are provided with a respective signal generator device DG, and/or some or all of the connected objects OC are likewise provided with a respective signal generator device DG.

In the example shown in FIG. 1, the system SC enables an application signal S1 conveying data acquired by a connected object OC to be associated with accurate timestamp information supplied by a radio synchronization signal S2 broadcast continuously by a "universal" external synchronization device SS. By way of example, this synchronization device SS is a satellite navigation system such as a GPS system, a global navigation satellite system (GLONASS), a Galileo, a Doppler orbitography and radiopositioning integrated by satellite (DORIS), a Beidou, . . . system or a radio controlled clock device. The reference S is used to designate the signal resulting from combining the signals S1 and S2 as is done by the signal generator device DG.

In accordance with the invention, the signal S is generated by the signal generator device DG integrated in the receiver station ER on the basis of a reversible operation applied to the application signal S1 and to the synchronization signal S2. As mentioned above, the term "reversible operation" is used to cover any type of processing for which there exists a so-called "inverse" operation that can be applied to the third signal and that makes it possible to reconstruct the first and second signals S1 and S2, or at least to extract from the signal S the information conveyed by the first signal S1 and the information conveyed by the synchronization second signal S2. Examples of such systems are described below.

In the presently-described embodiment, the connected object OC, the receiver station ER, and the synchronization device SS communicate with one another by radio. Nevertheless, no limitation is attached to the nature of the communication link between the connected object OC and the receiver station ER. It may equally well be a radio communication link, a wired link, an optical link, etc.

The receiver station ER and the information system SI communicate with each other via the communications network NW. No limitation is attached to the nature of the communications network NW. It may equally well be a telecommunications network that is fixed, mobile, wireless, wired, etc.

Figure 2:
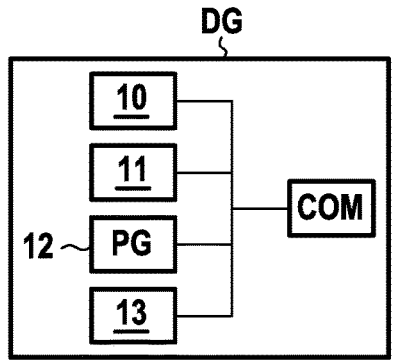
FIG. 2 shows the hardware architecture of a signal generator device in accordance with the invention in a particular embodiment.
Figure 3:
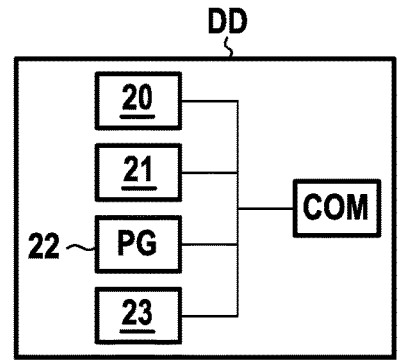
FIG. 3 shows the hardware architecture of a signal processor device in accordance with the invention in a particular embodiment.

In the presently-described embodiment, the signal generator device DG and the signal processor device DD have the hardware architecture of a computer, as shown diagrammatically in FIG. 2 and in FIG. 3, respectively.

With reference to FIG. 2, the signal generator device DG comprises in particular a processor 10, a rewritable non-volatile memory 11, a ROM 12, a random access memory (RAM) memory 13, and a communication module COM.

The communication module COM has various interfaces that enable it to communicate by radio with the synchronization device SS to receive the synchronization signal S2 and with the connected object OC to receive the application signal S1, and via the communications network NW with the information system SI in order to transmit thereto the signal S that is generated in accordance with the invention. These interfaces may in particular include radio frequency (RF) modules, a network card, etc., adapted to the various communications networks under consideration.

The ROM 12 of the signal generator device DG constitutes a data medium in accordance with the invention that is readable by the processor 10 and that stores a computer program PG in accordance with the invention including instructions for executing steps of a signal generation method of the invention as performed by the signal generator device DG and comprising steps that are described in detail below with reference to FIG. 4.

In equivalent manner, the computer program PG defines functional modules of the signal generator device DG (referred to herein as "software modules"), and in particular in this example an obtaining module MO for obtaining the application signal S1 and a receiver module MR for receiving the synchronization signal S2 that rely in this example on the communication module COM, together with a signal generator module MG.

The functions of these software modules are described in greater detail below with reference to the steps of the signal generation method of the invention.

With reference to FIG. 3, and in similar manner, the signal processor device DD comprises in particular a processor 20, a rewritable non-volatile memory 21, a ROM type memory 22, and a RAM type memory 23.

The timestamping device DD also has a communication module COM suitable for receiving from the receiver station ER the signal S as generated in accordance with the invention.

The ROM 22 of the signal generator device DD constitutes a data medium in accordance with the invention that is readable by the processor 20 and that stores a computer program in accordance with the invention including instructions for executing steps of a signal processing method of the invention as performed by the signal processor device DD and comprising steps that are described in greater detail below with reference to FIG. 5.

In equivalent manner, the computer program defines a functional module of the signal processor device DD (referred to herein as "software" modules), and in particular in this example a receiver module MR for receiving the signal generated by the signal generator device DG that relies in this example on the communication module COM, and also an extractor module ME.

The functions of the modules MS and MD are described in greater detail below with reference to the steps of the signal processing method of the invention.

Figure 4:
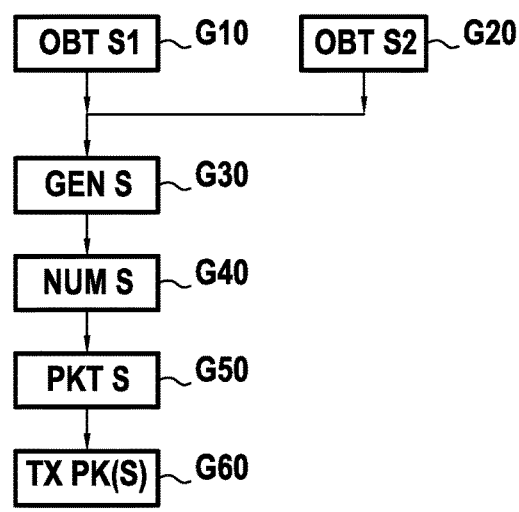
FIG. 4 is a flow chart showing the main steps of the method performed by the FIG. 2 signal generator device in a particular implementation of the invention.

With reference to FIG. 4, there follows a description of the main steps of the method performed by a receiver station ER of FIG. 2, and more precisely by the signal generator device DG of this station in accordance with the invention, in a particular implementation.

It is assumed that a connected object OC continuously acquires data and transmits that data by radio in the form of an application signal S1 to the receiver station ER. The data may be acquired by the connected object OC by means of a sensor or a measurement device e.g. fitted to the connected object, or it may be generated by the connected object itself.

In this example, the application signal S1 occupies a frequency band BD1 (e.g. [863 megahertz (MHz), 870 MHz]). The signal S1 received by the receiver station ER via its RF modules is transmitted via its communication module COM to its obtaining module MO (G10).

The application signal S1 conveys the stream of data acquired by the object OC.

Simultaneously, the receiver station ER also receives (G20) continuously via its RF module a synchronization signal S2 occupying a frequency band BD2 (e.g. [1575.42−Δ MHz, 1575.42+Δ MHz]) and coming from the satellite navigation system SS. In this example, the synchronization signal S2 is a GPS signal. In known manner, this synchronization signal S2 comprises raw information I (e.g. an atomic clock) supplying a timestamp for the application signal S1 received at the same moment, i.e. information I specifying accurately the instant (date and time) that the application signal S1 was obtained.

The receiver station ER then uses its signal generator module MG to generate (G30) a signal S by using a reversible operation to combine the application signal S1 and the synchronization signal S2.

In the presently-described embodiment, the reversible operation consists in frequency multiplexing the signals S1 and S2 in two consecutive frequency bands. For this purpose, the signal generator module MG may for example transpose the signal S2 occupying the band BD2 to a frequency band BD2' (e.g. [870 MHz, 870+2Δ MHz]) consecutive to the frequency band BD1 (e.g. [863 MHz, 870+Δ MHz]). The signal S is then obtained by concatenating the application signal S1 occupying the frequency band BD1 and the signal S2 as transposed into the band BD2'. It occupies a frequency band BD=[B1, B2], i.e. in this example [863 MHz, 870+2Δ MHz].

In this embodiment, the signals S1 and S2 are analog signals and they are combined in the analog domain. The frequency multiplexing operation used is orthogonal and reversible, i.e. the application signal S1 and the synchronization signal S2 can easily be separated by using a conventional bandpass filter.

In the presently-described embodiment, the receiver station ER then proceeds to digitize (G40) the signal S to form digital samples, by using an analog-to-digital converter. Thereafter, it subdivides (G50) the samples obtained into packets, e.g. in compliance with the IP protocol. Thereafter it sends (G60) the packets as subdivided in this way to the information system SI via the communications network NW.

In a variant, the received signals S1 and S2 are digitized (G40) by the receiver station ER prior to generating the signal S. This digitizing, performed in conventional manner by means of an analog-to-digital converter. It should be observed that both signals may be sampled at the same sampling frequency or at different sampling frequencies. Under such circumstances, the receiver station ER proceeds to adjust the rates of the two digitized signals (e.g. by means of interpolation) prior to combining them so as to make their rates identical. The generated signal S that is then obtained is in the form of digital samples.

Reversible operations other than frequency multiplexing may naturally be considered for combining the signals S1 and S2. These operations may be orthogonal or not orthogonal.

Thus, by way of example, the reversible operation may consist in multiplexing using orthogonal codes. With such an operation, the signals S1 and S2 may be transferred to baseband and then spread using respective codes C1 and C2 (e.g. Walsh sequences) that are mutually orthogonal, prior to being summed.

In another variant, the reversible operation may consist in steganographic multiplexing. In particular, the low-weight bits of the samples of the application signal S1 may be used for conveying the bits of the synchronization signal S2. For example, eight bits of the synchronization signal S2 use the last two bits of the application signal S1 over four successive samples of the application signal S1.

In yet another variant, the reversible operation consists in a "watermarking" operation. In this variant, the signal S2 is a signal of high spectrum density (e.g. a spread spectrum signal) while the signal S1 is a narrow-band signal of low density. The signal S is obtained by superposing the signals S1 and S2. The two signals S1 and S2 can then be separated on reception merely by filtering.

It is appropriate to observe that in order for a combination operation to be considered as being "reversible" in the meaning of the invention, it is not necessary to be able to reconstruct the first and second signals perfectly identically compared with the signals S1 and S2 that were used for generating the signal S. Reconstruction that makes it possible to extract the information (data and/or timestamp information) conveyed by the signals S1 and S2 with sufficient quality (or signal-to-noise ratio) suffices to be considered as being reversible in the meaning of the invention. By way of example, this applies to an operation of the watermarking type as described above. In other words, the concept of an operation that is "reversible" in the meaning of the invention includes orthogonal operations that make it possible to restore the first and second signals identically, and also operations that are not orthogonal, which could be said to be "quasi-reversible", that do not enable the first and second signals to be restored exactly (i.e. reconstructed), providing these operations still enable the information conveyed by these signals to be extracted. In other words, providing there exists an inverse operation enabling the application signal S1 and the synchronization signal S2 to be restored (i.e. extracted) from the signal S.

It can readily be understood that depending on the reversible operation in question, the signals (S1, S2, S) are digitized before or after being combined.

In another embodiment of the invention, the signal generator device DG is located in the connected object OC that acquires the data conveyed by the application signal S1. Under such circumstances, the connected object OC generates the combined signal S in the analog domain from the analog signals S1 and S2 and transmits the analog signal S as generated in this way directly by radio to the receiver station ER. The receiver station ER digitizes and subdivides the sampled signal S into packets, and then transmits the packets to the information system SI via the communications network NW.

Figure 5:
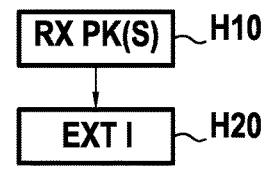
FIG. 5 is a flow chart showing the main steps of the method performed by the FIG. 3 signal processor device in a particular implementation of the invention.

With reference to FIG. 5, there follows a description of the main steps of the method performed by the information server SI (and more particularly by its signal processor device DD) on receiving packets of digital samples sent by the receiver station ER in a particular embodiment of the invention.

Via its receiver module MR, the information system SI receives (H10) the packets of digital samples coming from the receiver station ER via the communication network NW. The information system SI assembles these packets in order to obtain a series of digital samples of the signal S as generated using a reversible operation by the signal generation method in accordance with the invention.

Thereafter, and in this example by means of its extractor module MS, the information system SI extracts (H20) two series E1 and E2 of digital samples corresponding respectively to the digitized versions of the application signal S1 and of the synchronization signal S2. In this example, for a reversible operation based on orthogonal frequency multiplexing, this operation is performed by conventional digital filtering.

In the presently-described embodiment, the information system SI uses the raw timestamp information I carried by the synchronization signal S2 to timestamp accurately the digital samples conveyed by the signal S1 and to store these samples using a time criterion in a database.

In a variant, the information system SI can store these samples without processing the information contained in the synchronization signal S2.

In a variant, the information system SI can obtain the location of the connected object OC from the timestamp information I in the synchronization signal S2 in known manner, e.g. by calculating a flight time by using the information I.

In the presently-described embodiment, the signal processor device DD is implemented in the information system SI. In a variant, in another embodiment, the signal processor device DD is implemented in some other equipment of the client entity.

The invention claimed is:

1. A method comprising:
   generating a signal that is to be transmitted in a network of connected objects, comprising the following acts performed by a signal generating device:
      obtaining a first signal conveying a stream of data acquired by a connected object of the network;
      receiving a synchronization second signal including information providing a timestamp for the first signal; and
      generating a third signal by using a reversible operation to combine the first signal and the synchronization second signal, without timestamping the stream of data by transforming and determining the timestamp information from the second signal after synchronizing the signal generating device with a common reference; and
   transmitting the third signal via a communications network.

2. The method according to claim 1, wherein said reversible operation comprises frequency multiplexing the first and second signals on two consecutive frequency bands.

3. The method according to claim 1, wherein said reversible operation comprises multiplexing the first and second signals using orthogonal codes.

4. The method according to claim 1, wherein said reversible operation comprises steganographic multiplexing of the first and second signals.

5. The method according to claim 1, wherein said synchronization second signal is received from a satellite navigation system.

6. The method according to claim 1, wherein the connected object includes the signal generating device, said third signal is an analog signal, and said method includes an act of the connected object transmitting the third signal to a digitizing receiver station of the network of connected objects.

7. The method according to claim 1, wherein the network of connected objects includes a digitizing receiver station, which includes the signal generating device, and wherein transmitting the third signal comprises:
   digitizing the third signal;
   subdividing the digitized third signal into packets; and
   transmitting the packets to an information system via the communications network.

8. The method according to claim 1, wherein the network of connected objects includes a digitizing receiver station, which includes the signal generating device, and, wherein transmitting the third signal comprises:
   digitizing the first signal and the synchronization second signal prior to the act of generating the third signal;
   subdividing the third signal into packets; and
   transmitting the packets to an information system via the communications network.

9. A signal processing method for processing a third signal transmitted in a network of connected objects, the signal processing method comprising the following acts performed by a signal processing device:
   receiving, via a communications network, the third signal, wherein the third signal comprises a first signal conveying a stream of data acquired by a connected object of the network and a synchronization second signal including information providing a timestamp for the first signal, which are combined in the third signal by a reversible operation, without timestamping the stream of data by transforming and determining the timestamp information from the second signal after synchronizing the signal generating device with a common reference;

extracting data conveyed by the first signal and/or timestamp information contained in the synchronization second signal by using an operation that is an inverse of the reversible operation used during the signal generation by the signal generating device.

10. The method according to claim 9, including obtaining a timestamp for the data conveyed by the first signal and/or a location for the connected object that acquired the data, by using the timestamp information included in the synchronization second signal.

11. A signal generator device for generating a signal that is to be transmitted in a network of connected objects, said device comprising:

a processor; and a non-transitory computer-readable medium comprising instructions stored thereon, which when executed by the processor configure the processor to perform acts comprising:

obtaining a first signal conveying a stream of data acquired by a connected object of the network;

receiving a synchronization second signal including information providing a timestamp for the first signal; and generating a third signal by using a reversible operation to combine the first signal and the second signal, without timestamping the stream of data by transforming and determining the timestamp information from the second signal after synchronizing the signal generating device with a common reference.

12. A signal processor device for processing a signal transmitted in a network of connected objects, said device comprising:

a processor; and a non-transitory computer-readable medium comprising instructions stored thereon, which when executed by the processor configure the processor to perform acts comprising:

receiving, via a communications network, a third signal, wherein the third signal comprises a first signal conveying a stream of data acquired by a connected object of the network and a synchronization second signal including information providing a timestamp for the first signal, which are combined in the third signal by a reversible operation, without timestamping the stream of data by transforming and determining the timestamp information from the second signal after synchronizing the signal generating device with a common reference;

extracting data conveyed by the first signal and/or the timestamp information included in the synchronization second signal from the received third signal by using an operation that is the inverse of the reversible operation used during the signal generation method.

13. A non-transitory computer-readable data medium comprising a computer program stored thereon, which comprises instructions for executing a method of generating a signal that is to be transmitted in a network of connected objects, when the instructions are executed by a processor, wherein the method comprises the following acts:

obtaining a first signal conveying a stream of data acquired by a connected object of the network;

receiving a synchronization second signal including information providing a timestamp for the first signal;

generating a third signal by using a reversible operation to combine the first signal and the synchronization second signal, without timestamping the stream of data by transforming and determining the timestamp information from the second signal after synchronizing the signal generating device with a common reference; and transmitting the third signal via a communications network.

* * * * *